No. 805,653. PATENTED NOV. 28, 1905.
L. P. LOWE.
APPARATUS FOR CLEANING MANUFACTURED GASES.
APPLICATION FILED MAR. 10, 1902.

WITNESSES
E. W. Horne
S. McLaughlin

INVENTOR
L. P. Lowe

UNITED STATES PATENT OFFICE.

LEON P. LOWE, OF SAN FRANCISCO, CALIFORNIA.

APPARATUS FOR CLEANING MANUFACTURED GASES.

No. 805,653. Specification of Letters Patent. Patented Nov. 28, 1905.

Application filed March 10, 1902. Serial No. 97,592.

*To all whom it may concern:*

Be it known that I, LEON P. LOWE, a citizen of the United States, residing at San Francisco, State of California, have invented a new and useful Improvement in Apparatus for Cleaning Manufactured Gas, which improvement is fully set forth in the following specification and accompanying drawings.

My invention consists of an apparatus for cleansing manufactured gases by removing therefrom such foreign substances as condensable hydrocarbons or solid carbonaceous or other foreign substances by compression and friction and the saturation of same with aqueous vapor, preferably in the form of steam.

My invention embodies novel features, as will be hereinafter set forth and definitely claimed.

In the manufacture of ordinary commercial gases certain substances usually classed as impurities are removed with great difficulty and cannot be eliminated by the ordinary methods in general use of washing and scrubbing the gas, and I have found that if the gases containing such substances are compressed and subjected to considerable frictional resistance, simultaneously bringing into contact therewith watery vapor, preferably in the form of steam, the substances described are condensed and saturated to such an extent as to greatly increase their specific gravity, thus causing the ready falling of same and permitting of their recovery and removal.

When steam is used for purposes of saturation, as described, it is frequently necessary to remove same before using the gas, and this is best accomplished by condensing it by passing same over cooled surfaces.

To accomplish the foregoing, I use the apparatus or modifications of same, shown in the accompanying drawings, of which the following is a description.

Figure 1:
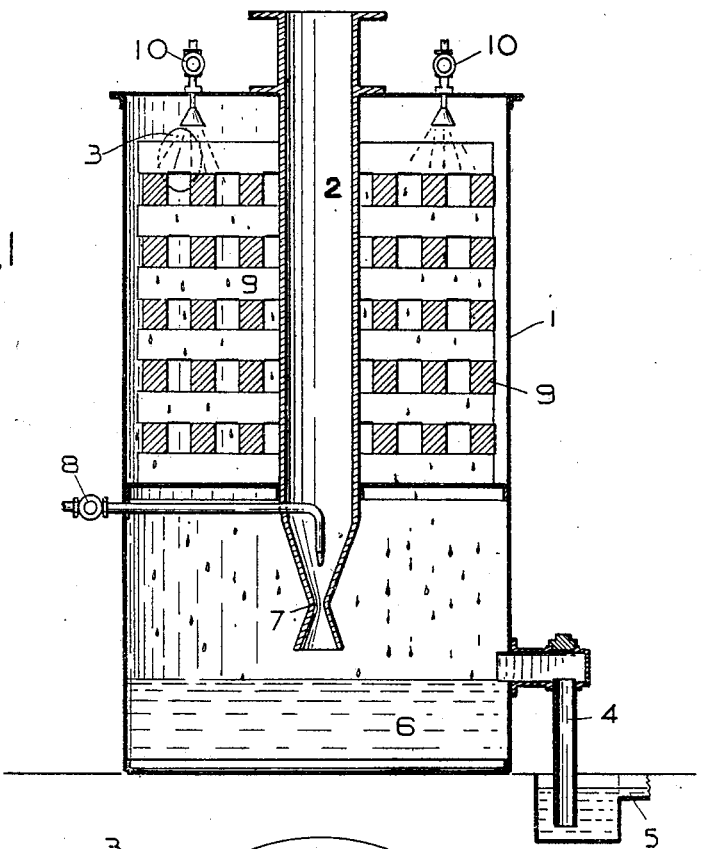
Figure 2:
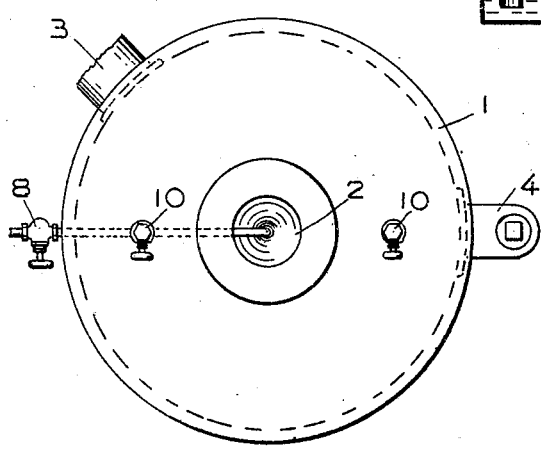

Figure 1 represents a vertical sectional elevation of the gas-condensing device embodying my invention. Fig. 2 represents a plan of same.

Similar numerals of reference indicate corresponding parts in both figures.

1 is a shell, preferably of cylindrical form and preferably composed of metal.

2 is an inlet-pipe to condenser 1.

3 is an outlet-pipe from condenser 1.

4 is an overflow-pipe from condenser 1, placed at such a height as to permit of the retention of a certain amount of water 6 in the bottom of condenser 1.

5 is an ordinary hydraulic seal which receives overflow-pipe 4.

7 is a constriction in inlet-pipe 2 of much the same form and construction as an ordinary steam-jet exhauster.

8 is a steam-supply pipe fitted with a suitable controlling-valve extending into the inlet-pipe 2 and constriction 7.

9 is an open-work mass of suitable solid substance, as brickwork, over the surface of which water is sprayed by admission through pipes 10.

The operation of this apparatus is as follows: Water is first admitted through pipes 10 and passing down over the surface of material 9 collects in the bottom of condenser 1 to the height of the overflow connection 4, in which condition the condenser is ready for the reception of gas, which is admitted through inlet-pipe 2, and by the exhausting action of the constriction 7, in combination with the steam-pipe 8, is forced through the narrow constriction 7, which causes a considerable compression of the gases and the simultaneous saturation thereof with the steam entering through pipe 8, thus causing a condensing and collection of any foreign substance contained in the gas to such an extent as to greatly increase its weight, in which state it will readily fall from the gas into the lower portion of the condenser 1, containing the water 6, wherein it will be trapped and retained. The gas thus freed from the described foreign substances is still saturated with steam and in a heated condition owing to same, in which state it passes upward through the cooled material 9, over which water issuing from pipes 10 is passing downward in a reversed direction to that traveled by the gas. The action is to condense the steam into cold water, thus thoroughly removing the same and permitting the gas to escape from outlet-pipe 3 in a thoroughly cooled and cleansed condition.

The condenser described above can be of any convenient form and construction, and I do not limit myself to any particular design; but in ordinary operation I prefer the arrangement as shown.

Having thus described my invention, I claim—

An apparatus for cleansing manufactured gases comprising a suitable casing to form a chamber, a gas-inlet having a constricted portion opening into the lower portion of said chamber, a steam-pipe discharging into said constricted portion of said gas-inlet, an outlet for the gas at the top of the chamber, an overflow-pipe connected with the chamber near the bottom and a water seal for said pipe whereby a body of water is collected therein whose level is determined by said overflow, the gas-inlet discharging directly downward toward the surface of the water, but the discharge-aperture being wholly above said surface, whereby the particles of greater density are projected into contact with the water, while the lighter gas escapes contact therewith, and means for providing a continual discharge of water into the upper portion of the chamber, substantially as described.

In witness whereof I have hereunto set my hand in the presence of two subscribing witnesses.

L. P. LOWE.

Witnesses:
ERNEST W. HORNE,
S. MCLAUGHLIN.